United States Patent
Ghaus et al.

(10) Patent No.: US 8,358,624 B1
(45) Date of Patent: Jan. 22, 2013

(54) BIDIRECTIONAL UPLINK/DOWNLINK HANDOFF

(75) Inventors: Mohammad Ghaus, Ashburn, VA (US); Pinal Tailor, Ashburn, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 960 days.

(21) Appl. No.: 12/270,204

(22) Filed: Nov. 13, 2008

(51) Int. Cl.
*H04W 4/00* (2009.01)
(52) U.S. Cl. ......................................... 370/331; 455/436
(58) Field of Classification Search ................... 370/337, 370/331; 455/436
See application file for complete search history.

(56) References Cited

U.S. PATENT DOCUMENTS

| | | | |
|---|---|---|---|
| 5,487,174 A | | 1/1996 | Persson |
| 5,862,489 A | * | 1/1999 | Aalto ............................. 455/522 |
| 6,628,631 B1 | * | 9/2003 | Mazawa et al. ............... 370/331 |
| 6,681,112 B1 | | 1/2004 | Schwarz et al. |
| 7,373,151 B1 | * | 5/2008 | Ahmed ....................... 455/452.2 |
| 2004/0147263 A1 | * | 7/2004 | Schwarz et al. .............. 455/436 |
| 2004/0174845 A1 | * | 9/2004 | Koo et al. ...................... 370/328 |
| 2006/0094430 A1 | * | 5/2006 | Shah .............................. 455/436 |
| 2009/0129334 A1 | * | 5/2009 | Ma et al. ........................ 370/331 |
| 2010/0056153 A1 | * | 3/2010 | Attar et al. .................... 455/436 |
| 2010/0323749 A1 | * | 12/2010 | Lee et al. ....................... 455/524 |

* cited by examiner

*Primary Examiner* — Sai-Ming Chan
(74) *Attorney, Agent, or Firm* — McDonnell Boehnen Hulbert & Berghoff LLP

(57) ABSTRACT

Disclosed herein is a method for selecting coverage areas as candidates for a handoff, and in particular, for a bidirectional handoff. An exemplary method may involve (a) engaging in a communication session via an access network, wherein an uplink connection is provided for uplink traffic in the communication session and a downlink connection is provided for downlink traffic in the communication session; (b) determining uplink-resource demand and downlink-resource demand of the communication session; (c) using the uplink-resource demand of the communication session as a basis for selecting one or more coverage areas in the access network as candidates for an uplink handoff of the uplink connection; and (d) using the downlink-resource demand of the communication session as a basis for selecting one or more coverage areas in the access network as candidates for a downlink handoff of the downlink connection.

17 Claims, 9 Drawing Sheets

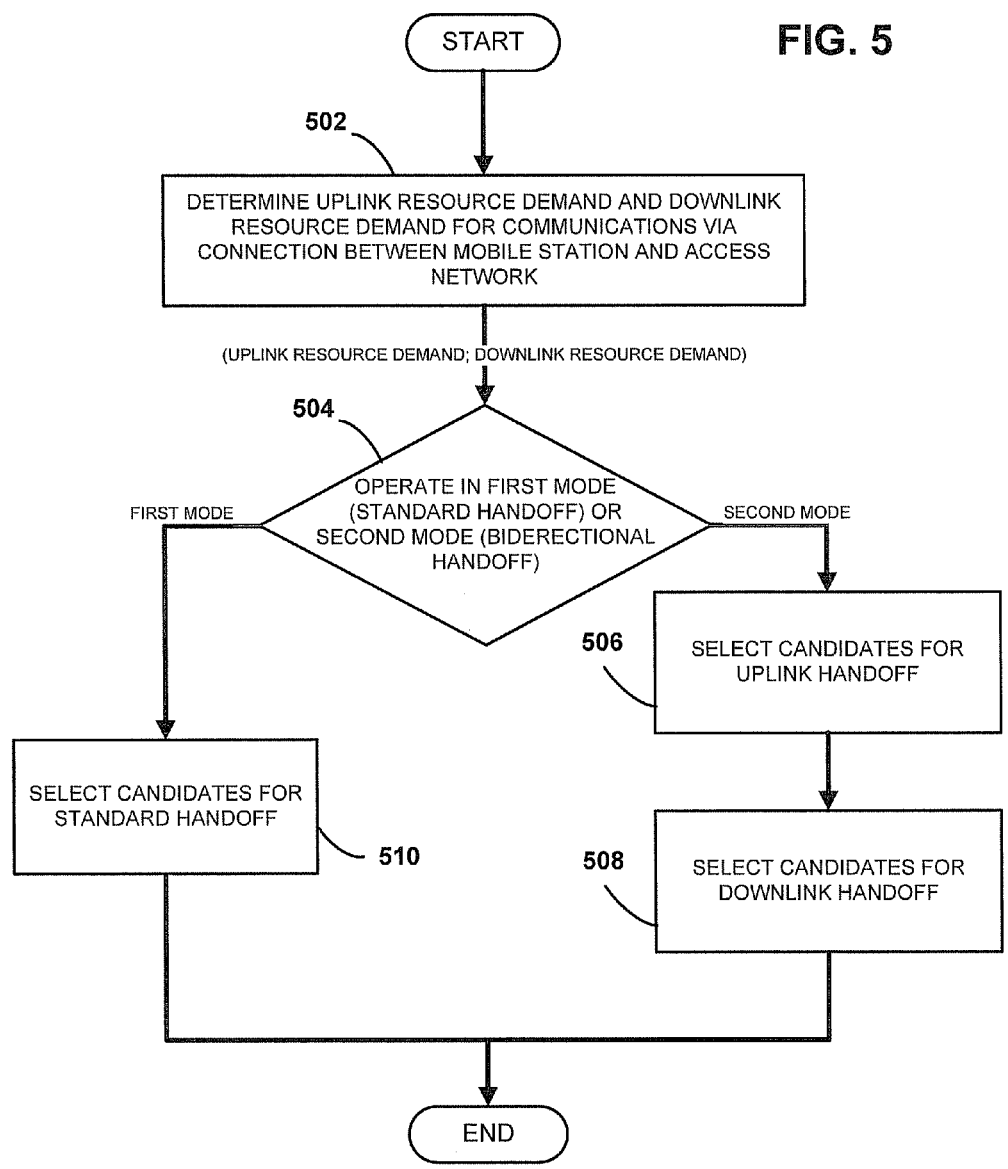

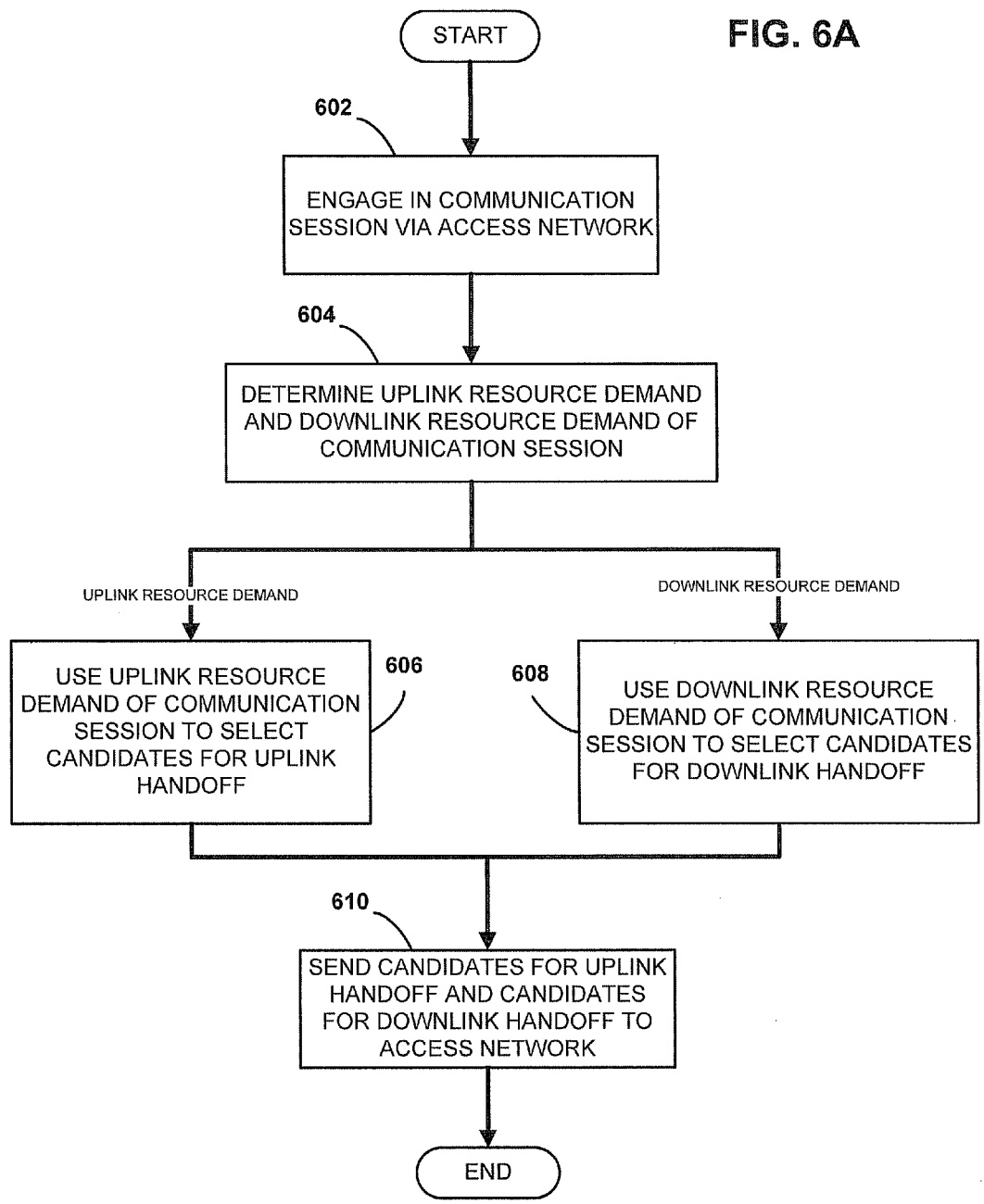

BIDIRECTIONAL UPLINK/DOWNLINK HANDOFF

BACKGROUND

An access network that provides air-interface service under an air-interface protocol such as WiMAX, or other air-interface protocols such as 1xRTT (Single Carrier Radio Transmission Technology) CDMA (Code Division Multiple Access), EV-DO (Evolution Data Optimized), WiFi (e.g. IEEE 802.11), GSM (Global System for Mobile Communications), etc., may include a number of base stations that provide service in one or more coverage areas of the access network. In order to provide substantially continuous service, base stations may be configured to perform a handoff, transferring a connection from one base station to another as a user moves from one coverage area to another in the access network.

Under certain air-interface protocols, such as WiMAX and CDMA, a connection between a mobile station and an access network may include two connections: (1) an uplink (or forward-link) connection over which the mobile station sends data to the access network and (2) a downlink (or reverse-link) connection over which the mobile station receives data from the access network. Thus, when a handoff is performed from one base station to another, or from one coverage area to another, the handoff involves transfer of both the uplink and downlink connections from the originating or "source" base station to a "target" base station.

OVERVIEW

Existing handoff techniques fail to take into account that a user may, at any given point during a communication session, have different uplink and downlink bandwidth requirements. However, a bidirectional handoff, in which target sectors for the uplink connection and the downlink connection are selected separately, may be utilized to help meet the requirements of a user with particular uplink and/or downlink bandwidth requirements. Accordingly, an exemplary method is disclosed in which the user's uplink-resource demand and downlink-resource demand (e.g., the uplink requirements and the downlink requirements of a communication in which the user is engaged) are determined, and then used to select candidates for an uplink handoff and candidates for a downlink handoff.

In one aspect, a method for selecting coverage areas as candidates for a bidirectional handoff is disclosed. The method comprises (a) engaging in a communication session via an access network, wherein an uplink connection is provided for uplink traffic in the communication session and a downlink connection is provided for downlink traffic in the communication session; (b) determining uplink-resource demand and downlink-resource demand of the communication session; (c) using the uplink-resource demand of the communication session as a basis for selecting one or more coverage areas in the access network as candidates for an uplink handoff of the uplink connection; and (d) using the downlink-resource demand of the communication session as a basis for selecting one or more coverage areas in the access network as candidates for a downlink handoff of the downlink connection.

In a second aspect, a method for selecting target coverage areas for a bidirectional handoff is disclosed. The method comprises: (a) providing a connection for a mobile station to engage in a communication, wherein the connection comprises an uplink connection for uplink traffic in the communication session and a downlink connection for downlink traffic in the communication session; (b) determining uplink-resource demand and downlink-resource demand of the communication session; (c) based, at least in part, on the uplink-resource demand of the communication session, selecting a first target coverage area to which an uplink handoff of the uplink connection should be directed; and (d) based, at least in part, on the downlink-resource demand of the communication session, selecting a second target coverage area to which a downlink handoff of the downlink connection should be directed.

In a third aspect, a method for selecting candidates for a handoff of a connection between a mobile station and an access network is disclosed. The connection may comprise an uplink connection for uplink communications and a downlink connection for downlink communications. The method comprises (a) determining an uplink-resource demand and a downlink-resource demand for communications of the mobile station via the connection; (b) based, at least in part, on the uplink-resource demand and the downlink-resource demand, making a determination as to whether to operate in a first mode or a second mode, wherein operation in the first mode comprises using a standard handoff process, and wherein operation in the second mode comprises using a bidirectional handoff process, where the bidirectional handoff process comprises an uplink handoff of the uplink connection and a downlink handoff of the downlink connection; (c) if the determination is to operate in the first mode, then (i) selecting one or more coverage areas as candidates for the uplink handoff and (ii) selecting one or more coverage areas as candidates for the downlink handoff; and (d) if the determination is to operate in the second mode, then selecting one or more coverage areas as candidates for a standard handoff performed according to the standard handoff process, wherein the standard handoff process comprises a handoff of both the uplink and downlink connections to a single coverage area.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which:

FIG. 5 is a flow chart illustrating a method for performing a handoff, according to an exemplary embodiment;

FIG. 6A is a flow chart illustrating a method for selecting coverage areas as candidates for a bidirectional handoff, according to an exemplary embodiment;

DETAILED DESCRIPTION

Methods for selecting coverage areas as candidates for a handoff are described herein. These methods may be described by way of example, with reference to exemplary embodiments where the methods are carried out by a mobile station and/or access network operating under the Worldwide Interoperability for Microwave Access (WiMAX) protocol (referred to interchangeably herein as the "WiMAX Standard," "802.16e Standard," or "802.16e Protocol"). WiMAX is an Institute of Electrical and Electronics Engineers (IEEE) standard, designated 802.16, with the 802.16e being the current version of the standard (the terms "IEEE 802.16," "IEEE 802.16e," and "WiMAX" may be used interchangeably herein). WiMAX provides a robust mechanism for wireless communication between base stations and mobile stations. In particular, WiMAX is designed to provide fixed, portable or non-line-of-sight service with a potential range of 6 miles, a potential bandwidth on the order of 40 megabits per second, and superior quality of service and security. However, those skilled in the art will understand that other air-interface protocols, such as IEEE 802.11, CDMA, and/or 1xEV-DO, among others, may be incorporated without departing from the scope of the invention.

I. WiMAX Network Architecture and Communications

Figure 1:
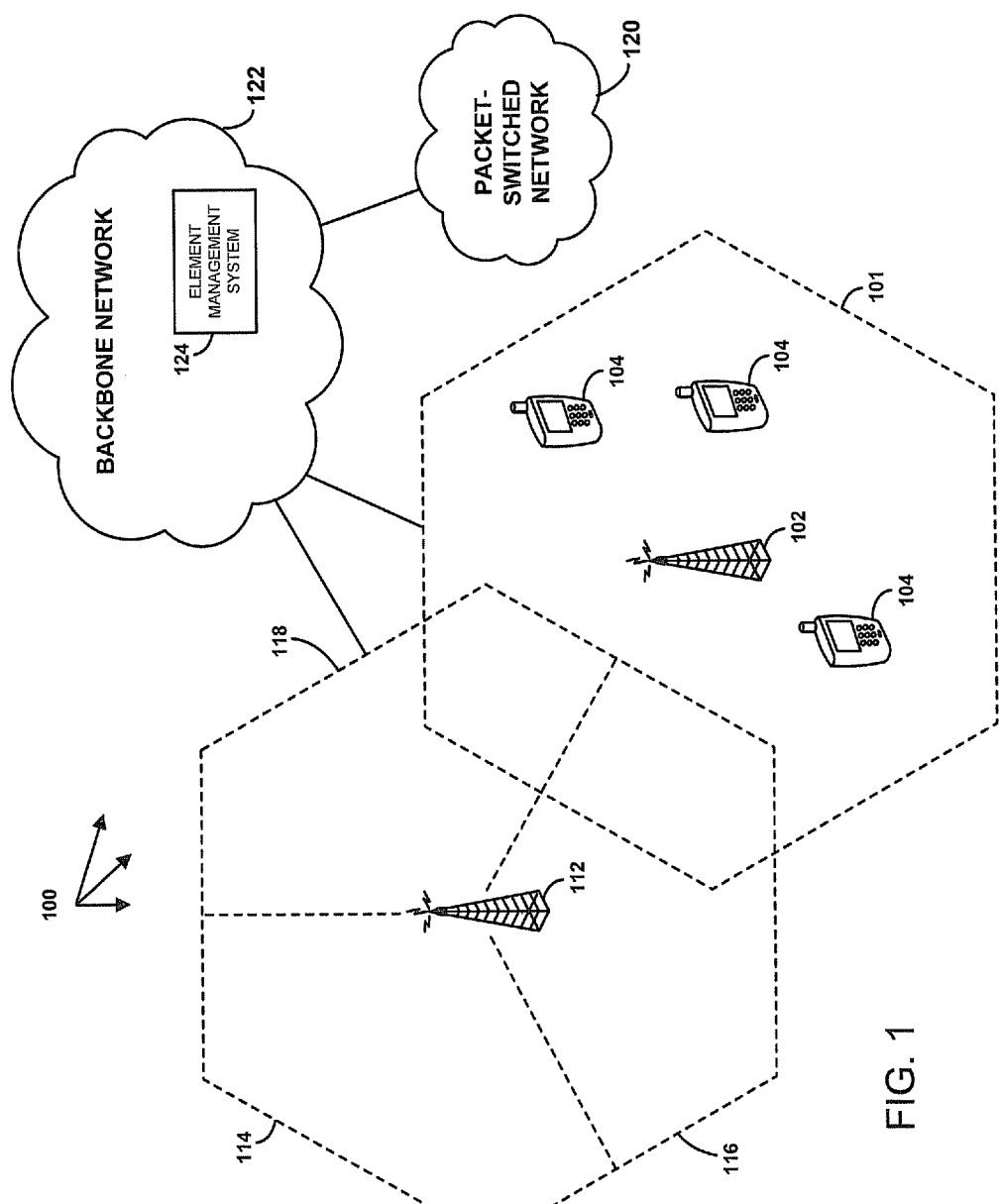
FIG. 1 is a block diagram illustrating an access network according to an exemplary embodiment.

FIG. 1 is a block diagram illustrating an access network 100, where service is available from a base station 102. Access network 100 includes base stations 102 and 112 and backbone network 122. Also shown are a plurality of mobile stations 104 that may engage in various types of communications via base station 102. The mobile stations may take the form of, for example, devices configured for WiMAX communications such as a desktop computer, a laptop computer, a wired or wireless router, a cellular telephone, a personal digital assistant, an MP3 player, an appliance, and/or various other WiMAX devices. Further, it should be understood that as described herein, a "mobile station" may be any device configured to communicate according to one or more wired or wireless protocols such as WiMAX, IEEE 802.11, CDMA, and/or 1xEV-DO, among others. It should also be understood that a mobile station is not necessarily mobile, and as such, may take the form of, for example, a desktop computer, a server, a television set-top box (e.g., a receiver or digital video recorder), etc.

Each of the air interfaces may define a wireless coverage area that is served by its corresponding base station 102, 112. To do so, each base station 102, 112 transmits an RF-radiation pattern that provides one or more air interfaces over which mobile stations 104 may communicate with the access network. Further, each base station 102, 112 may transmit omnidirectional RF-radiation patterns that provide a single air interface, or directional RF-radiation patterns that provide multiple air interfaces. The coverage area where service is provided by a given base station may be referred to as a cell, and in a configuration where the base station provides multiple air interfaces, the cell may be divided into multiple coverage areas, which each may each be referred to as a sector. In the illustrated example, base station 102 defines coverage area 101, which is a cell in access network 100, while base station 112 defines three coverage areas 114-118, which are each a sector within the cell defined by base station 112.

Provided with a connection to base station 102, a mobile station may engage in various types of communications. For instance, a base station 102 may provide connectivity to a packet-switched network 120 such as the Internet. Such packet-data connectivity may be provided via a service provider's backbone network 122 or directly. In addition to packet-data connectivity, a WiMAX connection may also provide access to other services, such as voice-over-IP (VOIP), among others.

Figure 2:
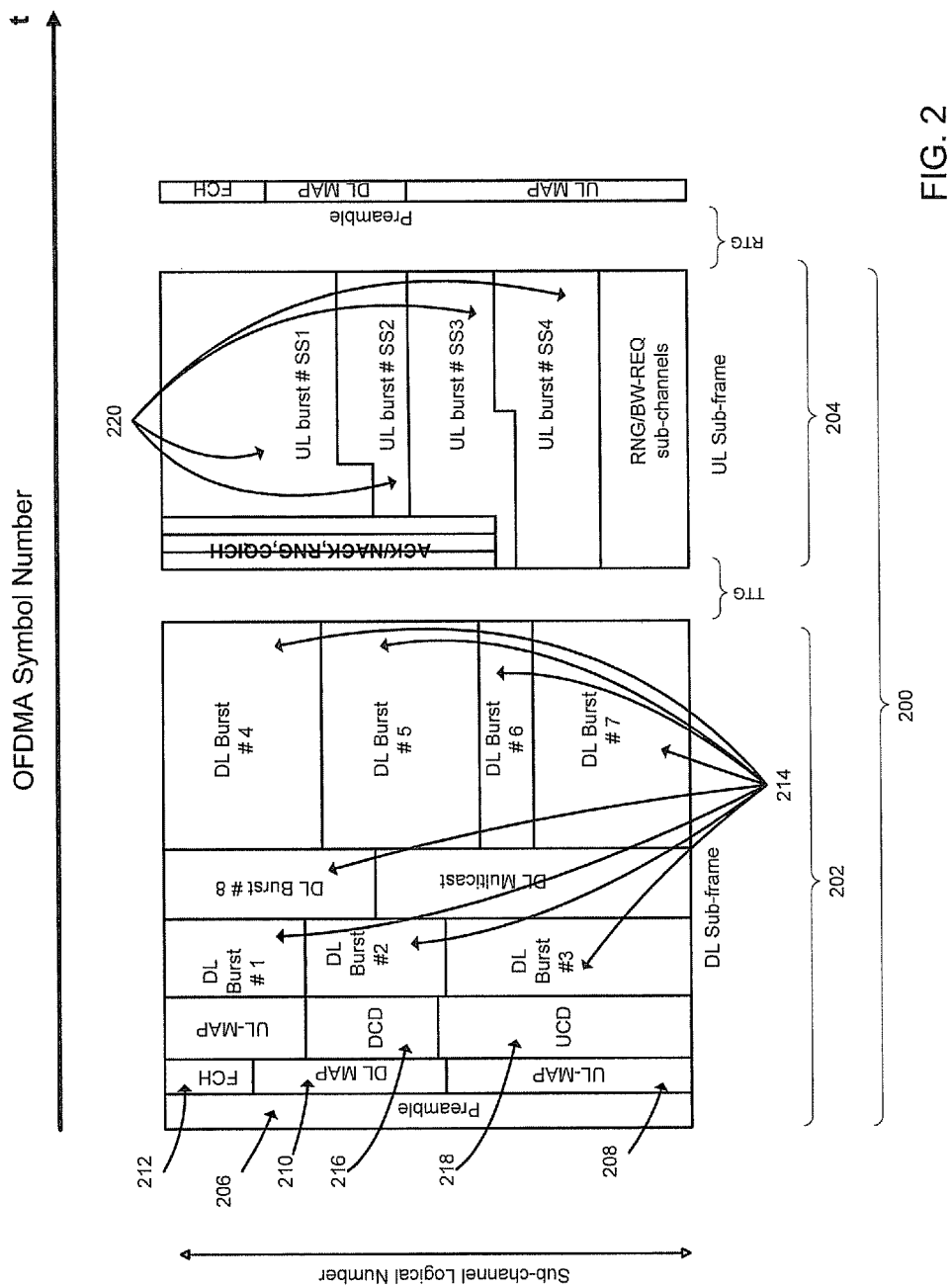
FIG. 2 is a block diagram illustrating the frame structure for a WiMAX frame, according to an exemplary embodiment.

In WiMAX, data communications between a mobile station and a base station 102 may be formatted into data frames, the structure of which is illustrated in FIG. 2. Each frame 200 includes a downlink (DL) sub-frame 202 and an uplink (UL) sub-frame 204. The DL and UL sub-frames provide various sub-channels and zones for communicating both overhead information (e.g., for session setup, etc.) and user traffic data on the downlink and uplink, respectively. For example, in the DL sub-frame 202, a base station typically broadcasts a preamble 206, an uplink map (UL-MAP) 208, a downlink map (DL-MAP) 210, a Frame Control Header (FCH) 212, and various downlink burst messages 214. When included in a frame, the DCD 216 and UCD 218 generally follow the FCH 212 and precede the UL-MAP 208 and DL-MAP 210. Preamble 206, UL-MAP 208, DL-MAP 210, DCD 216 and/or UCD 218, may be broadcast in a coverage area so that any mobile station within range of the transmitting base station can receive these transmissions. On the other hand, DL Bursts and UL Bursts typically include user traffic intended for specific clients, and thus are available only to those clients for which they are intended.

Referring to DL sub-frame 202 in greater detail, the preamble 206 is typically the first OFDM symbol in each WiMAX frame 200. The preamble 206 may identify the broadcasting base station, and may include a pseudorandom number (PN) code, which may be used by a mobile station for synchronization with a base station. Following preamble 206 in the frame is FCH 212, UL-MAP 208 and DL-MAP 210. UL-MAP 208 and DL-MAP 210 may provide sub-channel allocation, as well as other control information for the UL sub-frame 204 and DL sub-frame 202, respectively. For instance, a base station may determine the burst sizes that each mobile station will be allocated in the DL sub-frame 202 and in the UL sub-frame 204, and include this information in the DL-MAP 210 and UL-MAP 208, respectively. Additional details of the preamble, the FCH and its parameters, the DL-MAP and UL-MAP, and the overall structure of a WiMAX frame are well known to those skilled in the art and are provided by the 802.16 standard.

II. Handoffs under WiMAX

Referring back to FIG. 1, access network 100 may be configured to provide substantially continuous service to a mobile station as it moves throughout the access network. As such, base stations 102, 112 may be configured to perform a handoff in accordance with one or more air-interface protocols, such as WiMAX. For example, as the mobile station moves from coverage area 101, which is served by base station 102, to a coverage area served by base station 112, its connection may be transferred from base station 102 to an adjacent coverage area served by base station 112 (e.g., coverage area 116 or coverage area 118). It should be understood that a handoff can also be performed between sectors served by the same base station (e.g., a handoff from coverage area 118 to coverage area 114).

To facilitate the handoff, the access network 100 includes or has access to an element management system 124. More specifically, the element management system 124 may be configured to evaluate the topology of the access network 100, and to provide a base station with a neighbor list of base stations and/or coverage areas that are adjacent or in close proximity to the coverage area in which the mobile station is connected, and thus are candidates for a handoff. Base station 102 may in turn be configured to inform the mobile station 104 of the neighbor list. In WiMAX, a base station informs mobile stations of its neighbor list by periodically broadcasting a neighbor advertisement (MOB_NBR-ADV) message, which identifies its neighbor base stations and/or coverage areas.

Figure 3:
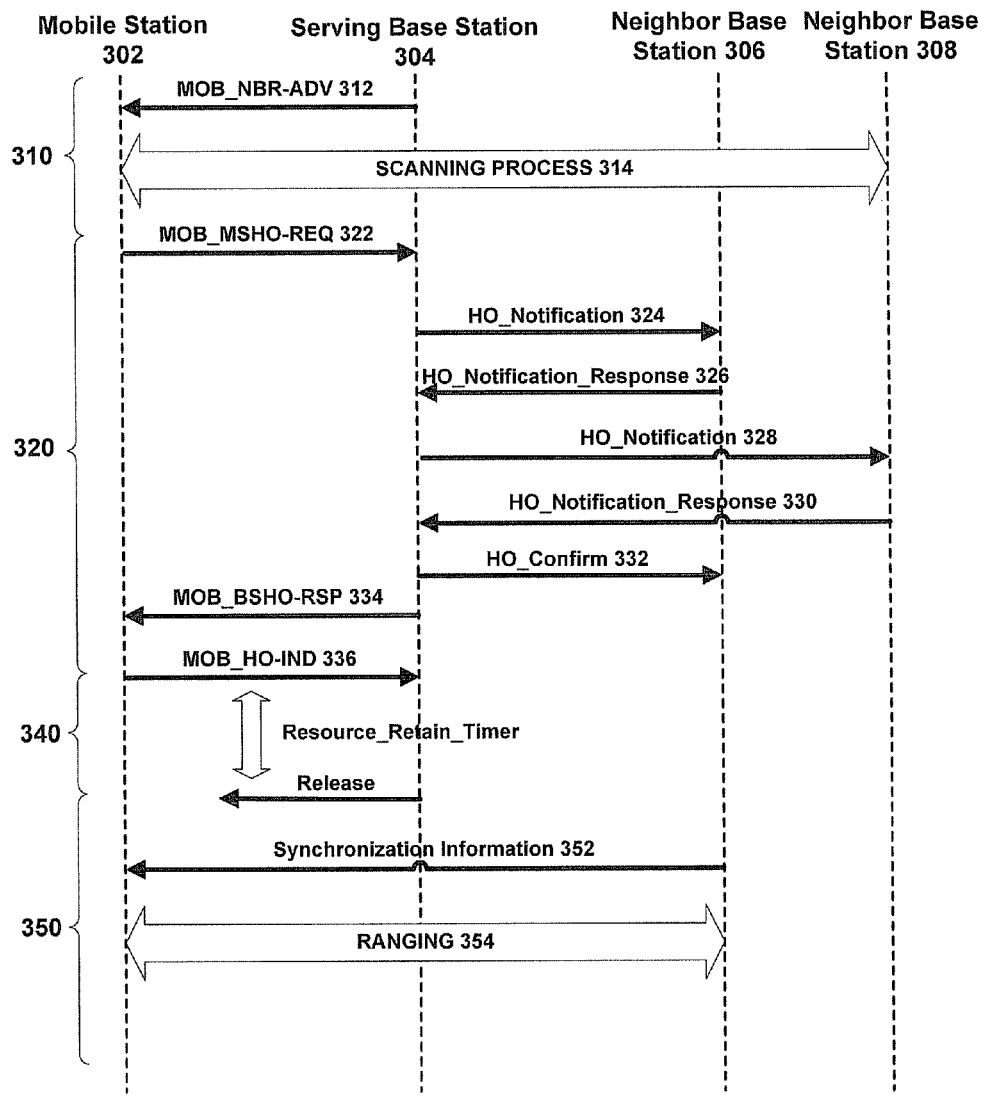
FIG. 3 is a message flow diagram illustrating the signaling and/or messages involved a standard handoff, according to an exemplary embodiment.

FIG. 3 is a message flow diagram illustrating an exemplary handoff performed according to 802.16e. The handoff is performed, at least in part, by a mobile station 302 that is connected to an access network in a source coverage area 303, via serving base station 304. Neighbors of serving base station 304 include base stations 306 and 308, which provide service in coverage areas 305 and 307, respectively. The illustrated handoff process may generally be divided into a number of sub-processes: (1) cell reselection 310, (2) handover decision/initiation 320, (3) serving base station connection termination 340, and (4) target base station connection 350. In the illustrated example, base station 308 is ultimately selected as the target base station for the handoff.

Under WiMAX, the process of cell reselection 310 may be used by the mobile station to collect information about neighboring base stations and/or neighboring coverage areas to evaluate each neighbor's availability and/or suitability as a handoff target. To facilitate this process, serving base station 304 periodically broadcasts information about its neighbors in a mobile neighbor-advertisement (MOB_NBR-ADV) message 312. Thus, the MOB_NBR-ADV message 312 may be said to provide a "neighbor list" of its adjacent and/or nearby base stations and their respective coverage areas. According to IEEE 802.16e, the base station transmits a MOB_NBR-ADV message 312 at least every thirty seconds. Further, the MOB_NBR-ADV message 312 typically identifies each neighboring base station by its base station identity (BSID), and includes channel information for each neighboring base station such as the radio frequency (RF), the downlink channel descriptor (DCD), and the uplink channel descriptor (UCD). Further, the neighbor list may identify which specific sectors from the neighboring base stations as neighbor sectors. Yet further, the neighbor list may also include other sectors from the serving base station that are candidates for a handoff from the sector in which the mobile station is currently connected.

The MOB_NBR-ADV message 312 may also include a "Configuration_Change_Count" parameter, which the base station increments whenever the base station includes additional neighbor base stations in the MOB_NBR-ADV message, removes neighbor base stations from the MOB_NBR-ADV message, updates information about neighbor base stations in the MOB_NBR-ADV message, or otherwise updates or modifies the MOB_NBR-ADV message. As such, when the mobile station receives subsequent MOB_NBR-ADV messages from the serving base station, the mobile station may check whether the base station has updated its neighbor information. To do so, the mobile station may decode just enough of the MOB_NBR-ADV message to obtain the Configuration_Change_Count parameter. The mobile station may then compare this newly obtained Configuration_Change_Count parameter to the Configuration_Change_Count parameter from the last fully-decoded MOB_NBR-ADV message. If the Configuration_Change_Count parameter is different, then the mobile station decodes the remainder of the new MOB_NBR-ADV message and stores the neighbor information from the MOB_NBR-ADV message. If, on the other hand, the Configuration_Change_Count parameter is unchanged, the mobile station ignores the remainder of the new MOB_NBR-ADV message, and continues to operate according to the neighbor list in its previously decoded MOB_NBR-ADV message.

Provided with an up-to-date MOB_NBR-ADV message, the mobile station 302 periodically engages in the neighbor base station scanning process 314. Additionally, or alternatively, the mobile station may be instructed to start the neighbor base station scanning process 314 by its serving base station. In particular, the base station may broadcast a message instructing a mobile station to initiate scanning process 314 and providing parameters for the scanning process. The serving base station may periodically broadcast this scanning instruction in the DCD of the WiMAX frame.

During scanning process 314, the mobile station terminal alternates between scanning the neighbor base stations identified by the neighbor list, and operating normally (e.g., sending and/or receiving data to/from its serving base station). As a result, the scanning process may consist of one or more cycles, with each cycle including a scan period and a period of normal operation. The duration of each scan period may be defined by a scanning interval parameter, while the duration of each period of normal operation may be defined by an interleaving interval parameter. In addition, a number of iterations parameter may specify how many cycles should be performed during scanning process 314.

Figure 4:
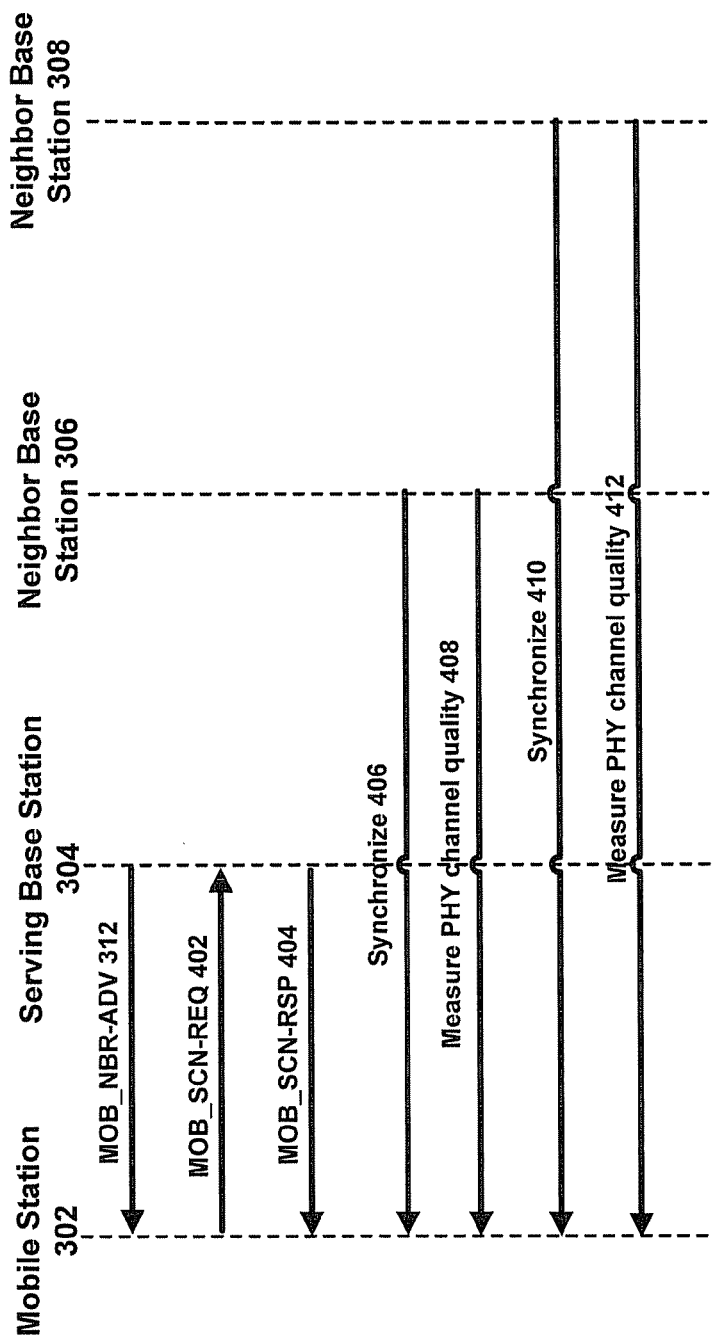
FIG. 4 is a message flow diagram illustrating the signaling and/or messages involved in an exemplary scanning process, according to an exemplary embodiment.

FIG. 4 is a message flow diagram illustrating the scanning process 314 in greater detail. As discussed, the serving base station 304 provides a neighbor list for the mobile station 302 in MOB_NBR-ADV message 312. Then, in response to a scanning instruction (not shown) from serving base station 304, or when the mobile station 302 determines that scanning should be performed, the mobile station sends a mobile scan request (MOB_SCN-REQ) message 402 to serving base station 304. In general, the MOB_SCN-REQ message 402 may be used by the mobile station to request resources for scanning and/or to request desired parameters for scanning. For instance, the MOB_SCN-REQ message 402 may include parameters such as the basic connection identity (CID) for the mobile station 302, and indicate desired values for scanning parameters, which may include the scanning interval, the interleaving interval, and the number of iterations for scanning (i.e., the number of cycles in the scanning process 314).

The serving base station 304 responds to the MOB_SCN-REQ message 402 by sending a mobile scan response (MOB_SCN-RSP) message 404 to the mobile station 302. In a MOB_ SCN-RSP message, the serving base station may either grant or reject the scanning requested by the mobile station. When scanning is granted, the mobile station 302 begins scanning neighbor base stations 306 and 308 according to final scanning allocation parameters and a start frame-number parameter provided in the MOB_SCN-RSP message. The final scanning parameters may be those requested by the mobile station 304 in the MOB_SCN-REQ message 402, or may differ. Further, the start frame-number parameter identifies the frame in which the mobile station should begin the scanning process. Further details of the MOB_SCN-RSP message are provided in the WiMAX standard and well known to those skilled in the art.

The results of the scanning process may be used by the mobile station and/or provided to the serving base station for use during a subsequent handoff. In particular, during the scanning process, the base station synchronizes and measures the physical (PHY) channel quality of each neighbor base station, as shown by signals 406 and 408 for base station 306, and signals 410 and 412 for base station 308. Further, the mobile station 302 may repeat the scanning process of base stations 306 and 308 (and possibly other base stations), as indicated by the number of scan iterations parameter. The mobile station 302 may then relay the information acquired during the scanning process, such as the PHY channel quality of neighbor base stations, to its serving base station. This information may then be used by the mobile station 302, serving base station 304, and/or base stations 306, 308 when performing a handoff. However, it should be understood that the mobile station may engage in the scanning process as a matter of course, regardless of whether or not a handoff is to be performed.

Referring back to FIG. 3, after scanning, the mobile station may request a handoff using signaling such as that illustrated by handoff decision/initiation process 320. In particular, the mobile station may send information acquired in scanning process 314 to its serving base station 304 in a mobile-station handoff-request (MOB_MSHO-REQ) message 322. It should be understood, that a base station may also initiate a handoff. In particular, the base station may initiate a handoff by sending a base-station handoff-request (MOB_BSHO-REQ) message (not shown) to the mobile station.

Before the serving base station 304 responds to MOB_MSHO-REQ message 322 (or before it sends a MOB_BSHO-REQ message), it determines if the candidate base stations 306, 308 have resources for the handoff, and if so, selects a target base station from the candidates. To do so, the serving base station 304 transmits a handoff notification (HO_notification) message 324, 328 to each candidate base station 306, 308 to inquire as to whether the candidate base station has resources to provide connectivity for the mobile station 302. In response, the candidate base stations 306 and 308 send HO_notification responses 326 and 330, respectively, to the serving base station 304. In an exemplary embodiment, each HO_notification response 326, 330 indicates whether or not sufficient resources exist to meet the quality-of-service (QoS) parameters of the connection. The serving base station 304 then selects a target base station 306 from the candidate base stations that indicate they have resources available for the handoff. To prepare to handoff the connection, the serving base station 304 then transmits an HO_confirm message 332 to the target base station 306.

To inform the mobile station 302 of the target sector, the serving base station 304 transmits a base-station handoff-response (MOB_BSHO-RSP) message 334 to the mobile station 302. The MOB_BSHO-RSP message 334 indicates whether or not a handoff should be performed, and if it should, the target base station for the handoff (identified by its base station ID (BSID)). If the handoff request is rejected, the mobile station may repeat the cell reselection process 310 and/or the handover decision and initiation process 320 in effort to determine an appropriate target for the handoff. If, on the other hand, the MOB_BSHO-RSP message 334 (or the MOB_BSHO-REQ message) indicates the handoff request is accepted, the mobile station makes a final handoff decision and sends its serving base station 304 a handoff indication (MOB_HO-IND) message 336 that indicates its final handoff decision.

The MOB_HO-IND 336 message may either confirm the handoff or reject the handoff (in which case the mobile station and serving base station may repeat the cell reselection process 310 and/or the handover decision and initiation process 320). The MOB_HO-IND message 336 may also indicate that the serving base station should release resources allocated for the mobile station and/or cancel the handoff (i.e., not attempt to repeat the cell reselection process 310 or the handover decision and initiation process 320). To confirm that a handoff should be performed, the mobile station includes a Target_BS_ID parameter in the MOB_HO-IND message, which confirms the target base station for the handoff. The MOB_HO-IND message may also include other parameters to facilitate the handoff such as ranging parameters, a preamble index and/or subchannel index for the target base station, etc. In the illustrated handoff process, the MOB_HO-IND message 336 includes a BSID identifying base station 306 as the target for the handoff. In addition, the MOB_HO-IND message 336 includes a serving base station release parameter, and thus the mobile station 302 and base station 304 engage in serving base station termination process 340.

The mobile station 302 may also include a Resource_Retain_Time parameter in the MOB_HO-IND message 336. The Resource_Retain_Time parameter indicates how long the serving base station 304 should retain downlink and/or uplink resources for the mobile station 302. When the serving base station receives MOB_HO-IND message 336, it stops making downlink allocations to the mobile station 302, stops polling the mobile station and stops making uplink allocations for unsolicited grant service (UGS) and Extended Real-Time Polling Service (ertPS) applications (if mobile station 302 is connected using these applications). However, until the resource release timer expires, the serving base station 304 continues to support bandwidth requests from the mobile station 302 and the resulting uplink allocations, which allows the mobile station to resend the MOB_HO-IND message, if necessary. Further, the serving base station 304 may maintain the medium access control (MAC) state machine for the communication session in which the mobile station is engaged over its connection, and may buffer packet data for the mobile station.

After sending MOB_HO-IND message 336 confirming the handoff, the mobile station 302 also begins the target base station connection process 350. It should be understood that while the connection process 350 is illustrated as occurring after serving base station connection termination 340, these processes or portions thereof may overlap. Initially, the mobile station 302 synchronizes with the target base station 306 on the downlink using sync information 352 (e.g., a preamble in a WiMAX frame) that is broadcast by the target base station. The mobile station 302 may have obtained the downlink and uplink transmission parameters for the target base station in a MOB_NBR-ADV message received during scanning, in which case further signaling to obtain these parameters may be unnecessary. Such parameters may include the Target_BS_ID, and the physical frequency, DCD, and UCD for the target base station. If such parameters were not acquired during scanning, the mobile station may still synchronize with the downlink of the target base station by scanning downlink channels until it finds the downlink signal for the target base station.

After the mobile station 302 synchronizes with the target base station 306, the mobile station and the target base station may engage in ranging 354. In an exemplary embodiment, the mobile station and target base station use an optional ranging process where the target base station sends a fast-ranging information element (IE) in its UL-MAP. The fast-ranging IE provides a non-contention-based allocation of uplink resources for ranging, which may allow for faster initial and/or handoff ranging. Alternatively, mobile station 302 may engage in standard initial or handoff ranging processes, which are also defined by 802.16e.

After successful ranging, the mobile station 302 and the target base station 306 may engage in process 356 to complete the connection between mobile station 302 and target base station 306. This process 356 may involve the target base station 306 requesting information regarding the mobile station 302 from either a backbone network or directly from the mobile station. The mobile station 302 may then negotiates basic capabilities, engage in a privacy key management (PKM) authentication phase and a traffic encryption key (TEK) establishment phase, and register with the target base station 306. Further details of connecting are provided by 802.16e and are well known to those skilled in the art.

III. Exemplary Methods for Selecting Handoff Candidates

FIG. 5 is a flow chart illustrating a method for performing a handoff, according to an exemplary embodiment. The method may be carried out by a mobile station, an access network (and in particular a base station), or by both the mobile station and the access network. The method may be carried while communications are ongoing via a connection between a mobile station and an access network. In an exemplary embodiment, the connection may be referred to as a two-way connection, and may consist of an uplink connection is provided for uplink communications and a downlink connection is provided for downlink communications.

The method involves determining the uplink-resource demand and the downlink-resource demand for communications via the two-way connection, as shown by block 502. Then, based at least in part on the uplink-resource demand and the downlink-resource demand, the mobile station and/or base station may determine whether to operate in a first mode or a second mode, as shown by block 504. In the first mode, the mobile station and/or base station use a standard handoff process, whereas the mobile station and/or base station use a bidirectional handoff process in the second mode. If the first mode is selected, then the mobile station and/or base station selects one or more coverage areas as candidates for the uplink handoff, as shown by block 506, and selects one or more coverage areas as candidates for the downlink handoff, as shown by block 508. If, on the other hand, the second mode is selected, then the mobile station and/or base station selects one or more coverage areas as candidates for a standard handoff performed according to the standard handoff process, as shown by block 510.

The bidirectional handoff process typically involves separate handoffs for the uplink connection and the downlink connection, which are referred to as the "uplink handoff" and the "downlink handoff," respectively. While it is possible that the same target coverage area and/or base station may be selected for both the uplink handoff and the downlink handoff, the selection of the uplink target is generally performed independently from the selection of the downlink target. Thus, the bidirectional handoff process differs from the standard handoff process in that handoff targets are selected for both the uplink connection and the downlink connection. In the standard handoff process, a single target is selected for both the uplink and downlink, without any separate consideration of uplink and downlink-resource requirements.

In an exemplary embodiment, determining the uplink-resource demand and the downlink-resource demand for communications via the two-way connection may involve the mobile station and/or base station determining that quality-of-service might be improved by a bidirectional handoff. For example, when a mobile station is moving rapidly during a communication session, switching rapidly between uplink and downlink activity during a communication session, and/or engaged in a type of communication with certain uplink and/or downlink bandwidth requirements, allowing the mobile station to connect in different coverage areas on the uplink and downlink may improve the quality of communications having distinct uplink and downlink bandwidth requirements.

More specifically, the mobile station and/or base station may determine a mobility factor for the mobile station (using GPS or another location-based application to track the movement of the mobile station), monitor the mobile station's uplink/downlink activity during a communication, and/or determine whether the mobile station is engaged in communications of a type that would benefit from a bidirectional handoff. Considering one or more of these factors, and possibly other factors as well, the mobile station and/or base station may then determine the uplink-resource demand and the downlink-resource demand for communications via the two-way connection. Further, regardless of whether or not a mobile station benefits from a bidirectional handoff, performance of a bidirectional handoff may be pre-conditioned on the mobile station being authorized for premium service.

When it is determined that a bidirectional handoff should be performed, the method may further involve the base station requesting that the mobile station provide preferred uplink and downlink neighbors. In particular, the base station may send a preferred neighbor request to the mobile station requesting that the mobile station identify one or more coverage areas as candidates for the uplink handoff and one or more coverage areas as candidates for the downlink handoff. The mobile station may respond by determining candidates for the uplink handoff (i.e., preferred uplink neighbors) and candidates for the downlink handoff (i.e., preferred downlink neighbors).

FIG. 6A is a flow chart illustrating a method for selecting coverage areas as candidates for a bidirectional handoff according to an exemplary embodiment. The method may be carried out by a mobile station, and may involve the mobile station engaging in a communication session via an access network, as shown by block 602. In order to engage in the communication session, the mobile station may be provided with an uplink connection for uplink traffic to its serving base station, and a downlink connection for downlink traffic from its serving base station. The method further involves the mobile station determining the uplink-resource demand and the downlink-resource demand of the communication session in which it is engaged, as shown by block 604. The mobile station may then use the uplink-resource demand of the communication session as a basis for selecting one or more coverage areas in the access network as candidates for an uplink handoff, as shown by block 606. Similarly, the mobile station may use the downlink-resource demand of the communication session as a basis for selecting one or more coverage areas in the access network as candidates for a downlink handoff, as shown by block 608. Further, the mobile station may send a message that identifies the uplink-handoff candidates and the downlink-handoff candidates to the access network, as shown by block 610.

Various factors may be considered in determining the uplink-resource demand and the downlink-resource demand. One such factor may be the typical uplink and/or downlink-resource demand of the type of communication or communications in which the mobile station is engaged. For instance, if the mobile station is engaged in a voice-over-IP (VoIP) session, which may involve heavy uplink and downlink traffic, the mobile station may determine that its uplink-resource demand and its downlink-resource demand are high. As another example, if a user is downloading video, the mobile station may determine that its uplink-resource demand is high, while its downlink-resource demand is low. And as an additional example, if the user is switching between downloading video from a server and then uploading video using ftp, the mobile station may determine that both its uplink-resource demand and its downlink-resource demand are high.

Another factor which may be considered in determining the uplink and/or downlink-resource demand is actual uplink and/or downlink activity during the course of the communication session. During a communication session, if the mobile station has requested or used a large (or small) amount of bandwidth to send data to the access network via the uplink connection, the mobile station may determine that the communication session has a high (or low) uplink-resource demand. Similarly, if during the communication session, the mobile station has requested or used a large (or small) amount of bandwidth to receive data via the downlink connection, the mobile station may determine that the communication session has a high (or low) downlink-resource demand.

The mobile station may then send a message to the access network identifying the uplink-handoff candidates and the downlink-handoff candidates. Alternatively, based on the uplink-resource demand and the downlink-resource demand, the mobile station may identify a single preferred uplink sector and a single preferred downlink sector, and send a message identifying these sectors to its serving base station. As another alternative, the mobile station may cancel or reject a bidirectional handoff in certain scenarios, such as when there is little or no performance gain to be had from handing off to different sectors for the uplink and downlink.

Further, the selection of uplink-handoff candidates and downlink-handoff candidates may involve other factors, in addition to the uplink-resource demand and the downlink-resource demand. For example, the mobile station may determine a mobility factor for the mobile station (using GPS or another location-based application to track the movement of the mobile station), and consider this mobility factor when selecting uplink and downlink handoff candidates. Further, the mobile station may compare the available uplink and/or downlink resources of the sectors in the neighbor list relative to each other, and factor this comparison into the selection of uplink and/or downlink candidates. In particular, the mobile station may consider and/or compare the carrier to interference-plus-noise ratio (CINR) and/or a received signal strength indication (RSSI) for the coverage area in each neighbor coverage area. Other factors may also be considered. The mobile station may then use these factors to further narrow the uplink-handoff candidates and/or the downlink-handoff candidates (e.g., by eliminating coverage areas it is moving away from, selecting coverage areas with resources that best match the uplink and/or downlink demands of the communication session, etc.).

In a further aspect, performance of a bidirectional handoff (and thus selection of candidates for uplink handoff and candidates for the downlink handoff) may be conditioned upon the mobile station being authorized to access to premium services. Thus, the mobile station may initially request bidirectional-handoff authorization from the access network or, more generally, may request authorization for premium services that include bidirectional handoff capabilities. Once authorization is received from the access network, the mobile station may proceed to select candidates for a bidirectional handoff in a manner such as that illustrated by blocks 504-510. If authorization is not received, the mobile station may request a handoff using standard techniques, such as that illustrated in FIG. 4.

In FIG. 6A, the uplink-resource demand and the downlink-resource demand are used to select uplink-handoff candidates and downlink-handoff candidates, respectively, while in FIG. 5 the uplink-resource demand and the downlink-resource demand are used to make a threshold determination as to whether or not to operate in a mode in which bidirectional handoffs will be performed. It should be understood that a method combining aspects of FIG. 5 and FIG. 6A falls within the scope of the invention (e.g., a method involving both the threshold decision to operate in a mode where bidirectional handoffs are performed, and the subsequent selection of uplink-handoff candidates and downlink-handoff candidates). As such, it should also be understood that an exemplary method may involve determining the uplink-resource demand and the downlink-resource demand twice—a first time in order to make the threshold decision to operate in a mode where bidirectional handoffs are performed, and a second time in order to select the uplink-handoff candidates and the downlink-handoff candidates. Further, different factors may be considered each time the uplink-resource demand and the downlink-resource demand are determined. Alternatively, the uplink-resource demand and the downlink-resource demand may be determined for the threshold decision, and this determination may be reused to select uplink-handoff candidates and the downlink-handoff candidates.

Figure 6B:
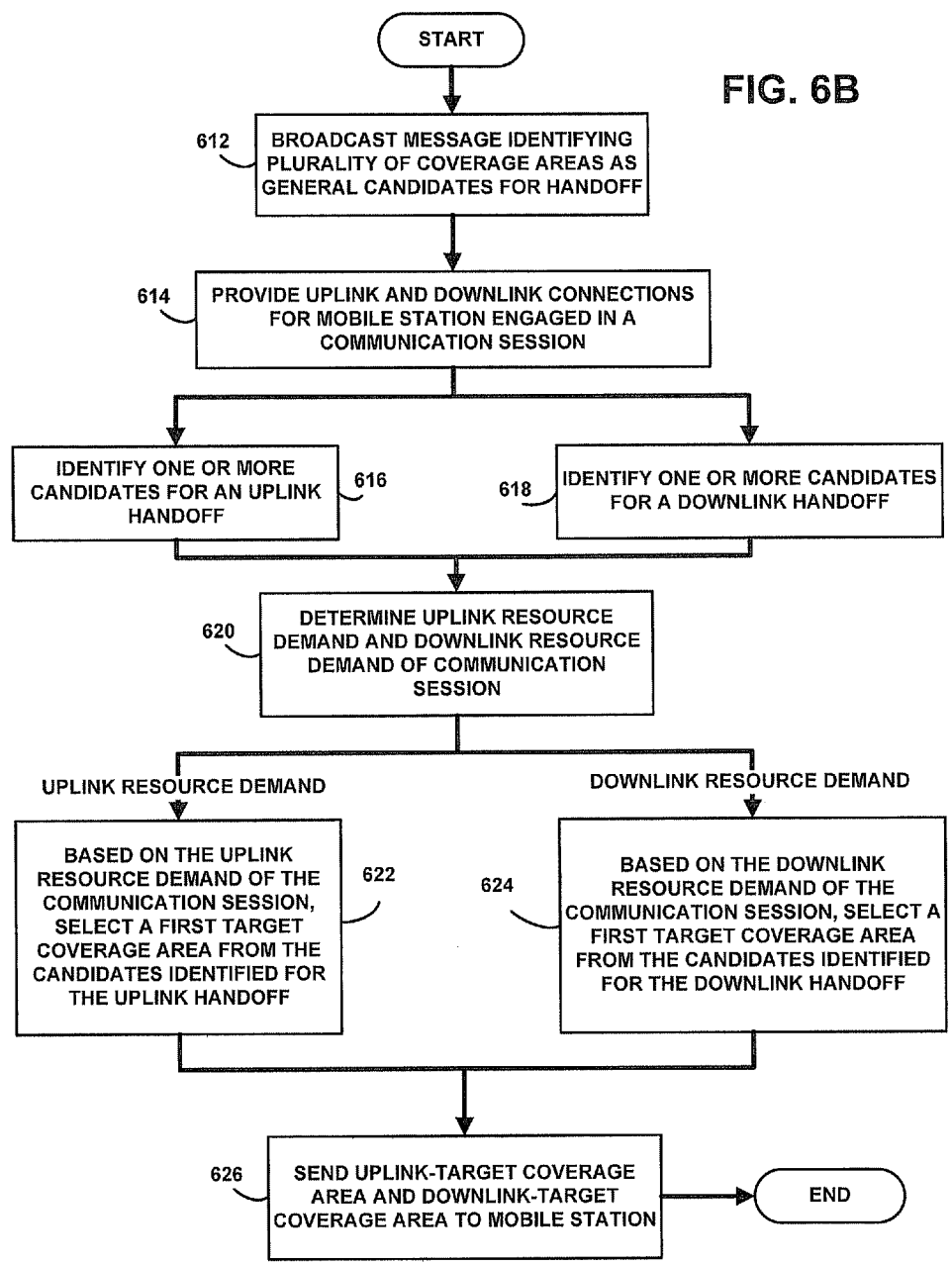
FIG. 6B is another flow chart illustrating a method for selecting target coverage areas for a bidirectional handoff, according to an exemplary embodiment.

FIG. 6B is a flow chart illustrating a method for selecting target coverage areas for a bidirectional handoff, according to an exemplary embodiment. In an exemplary embodiment, the method may be carried out by an access network, and in particular, by a base station. The base station broadcasts a message (such as a MOB_NBR-ADV message), which identifies a plurality of coverage areas in an access network as general candidates for a handoff, as shown by block 612. The base station also provides uplink and downlink connections for a mobile station engaged in a communication session via the access network, as shown by block 614. The uplink connection provides for uplink traffic to the access network from the mobile station, and the downlink connection provides for downlink traffic from the access network to the mobile station. The base station then identifies one or more coverage areas as candidates for an uplink handoff, as shown by block 616, and one or more coverage areas as candidates for a downlink handoff, as shown by block 618. Both the candidates for the uplink handoff and the candidates for the downlink handoff are selected from the general candidates for a handoff. The base station may then determine the uplink-resource demand and the downlink-resource demand of the communication session, as shown by block 620. Based at least in part on the uplink-resource demand of the communication session, the mobile station selects a first target (or uplink-target) coverage area from the candidates identified for the uplink handoff, as shown by block 622. Similarly, based at least in part on the downlink-resource demand of the communication session, the mobile station selects a second target (or downlink-target) coverage area from the candidates identified for the downlink handoff, as shown by block 624. The access network may then send a message to the mobile station that identifies the uplink-target coverage area and the downlink-target coverage area, as shown by block 626.

It should be understood that identifying candidates for the uplink and downlink handoffs may simply involve receiving a message or messages from a mobile station that identify the candidates for the uplink handoff and the candidates for the downlink handoff. Similarly, determining the uplink-resource demand and the downlink-resource demand of the communication session, may simply involve the base station receiving an indication or indications of the uplink-resource demand and the downlink-resource demand from the mobile station.

Figure 7:
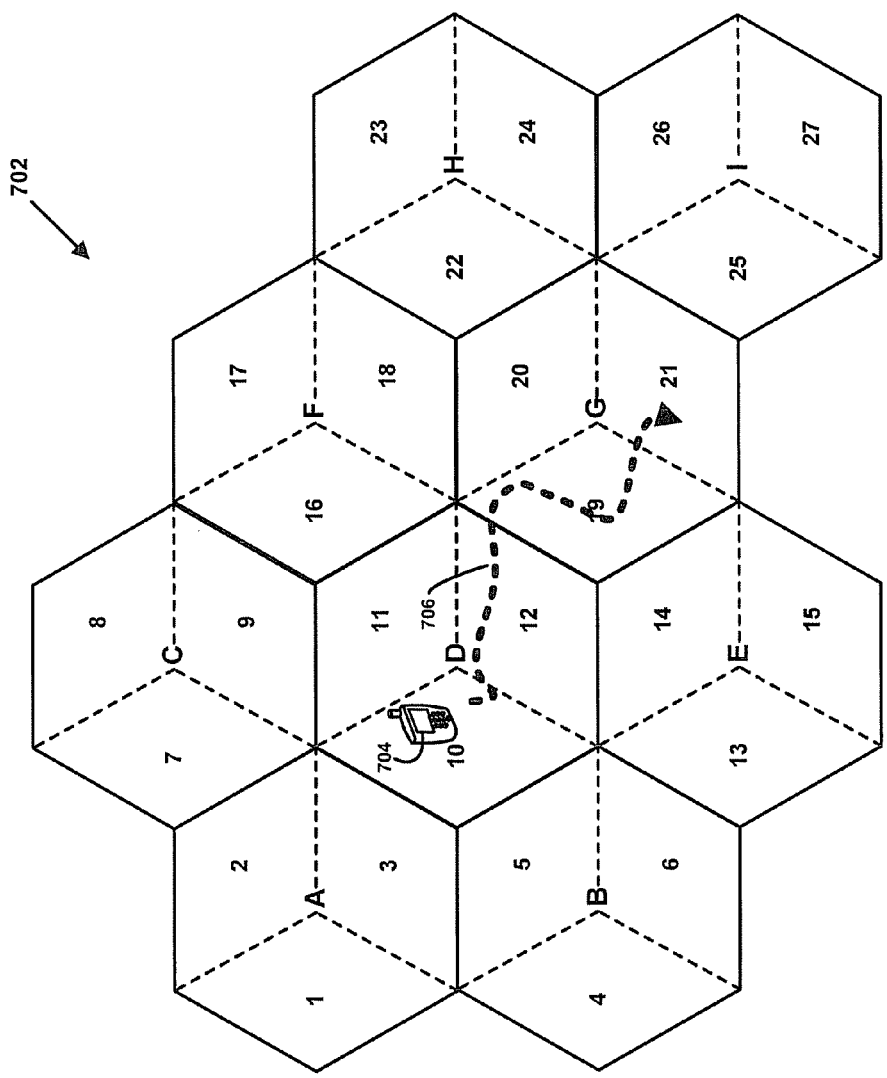
FIG. 7 is a diagram illustrating the topology of an access network in which a bidirectional handoff may be performed, according to an exemplary embodiment.

FIG. 7 illustrates the topology of an exemplary access network 702, in which a bidirectional handoff may be performed. In access network 702, each base station A-I serves a plurality of sectors. Each base station uses a different preamble to identify each sector it serves, and thus broadcasts the preamble identifying a particular sector in WiMAX frames for that sector. In particular, base station A provides service in the sectors identified by preambles 1-3, base station B provides service in the sectors identified by preambles 4-6, base station C provides service in the sectors identified by preambles 7-9, base station D provides service in the sectors identified by preambles 10-12, base station E provides service in the sectors identified by preambles 13-15, base station F provides service in the sectors identified by preambles 16-18, base station G provides service in the sectors identified by preambles 19-21, base station H provides service in the sectors identified by preambles 22-24, and base station I provides service in the sectors identified by preambles 25-27. To simplify the illustrated example, there is no reuse of preambles throughout the illustrated network 702. However, it should be understood that preambles may be reused within an access network, without departing from the scope of the invention.

In this example, the user of mobile station 704 may be a premium user, who has paid for premium services, including QoS-enhancement through bidirectional handoff. Thus, when the mobile station 704 connects to access network 702, the mobile station may request, and the access network may grant, authorization for premium services. As a result, the access network (and in particular, the serving base station), may from time to time evaluate the uplink/downlink-resource demand of the mobile station's communications, and determine whether the mobile station might benefit from bidirectional handoffs.

Mobile station 704 may travel throughout access network 702, following various different paths, such as path 706. Path 706 illustrates the movement of mobile station 704 during a communication session that is established by mobile station 704 in sector 10, where the mobile station connects via base station D. During the communication session, the mobile station 704 follows path 706, moving from sector 10 into sector 12, which is also served by base station D, then from sector 12 into sector 19, which is served by base station G, and finally from sector 19 into sector 21, which is also served by base station G.

When mobile station 704 is located in sector 10, it receives a neighbor list for sector 10 in a MOB_NBR-ADV message that is broadcast by base station D. The MOB_NBR-ADV message indicates that sectors 2, 3, 5, 6, 7, 9, 11, 12, 13, and 14 are neighbor sectors of sector 10. It should be understood that the neighbor list identifies general candidates for a standard handoff (i.e., transferring both uplink and downlink connections to the same target base station, without consideration of whether different base stations might be better suited for uplink and downlink traffic). In this example, the neighbor list includes all sectors that are adjacent to sector 10. However, other techniques for populating the neighbor list may be employed without departing from the scope of the invention.

When the mobile station moves from sector 10 to sector 12, a standard handoff may be performed. More specifically, it may be determined that the uplink-resource demand and the downlink-resource demand of the communication in which the mobile station 704 is engaged is low. For instance, if the user is simply browsing the Internet, and is looking at text-based news stories that are not data-intensive, the uplink and downlink bandwidth requirements are low. Further, if the user is moving slowly, the access network may define a low mobility factor for the mobile station, which further indicates a bidirectional handoff is unnecessary. Accordingly, when mobile station 704 moves into sector 12, a standard handoff is performed, and both the uplink and downlink connection are transferred to sector 12.

In sector 12, the mobile station 704 receives a new MOB_NBR-ADV message that is also broadcast by base station D, and identifies the neighbors of sector 12. In particular, the MOB_NBR-ADV message indicates that sectors 5, 6, 10, 11, 12, 13, 14, 16, 18, 19, and 20 are neighbors of sector 12. Further, while it is located in sector 12, the uplink and/or downlink-resource demand of mobile station 704 may change. For example, mobile station 704 may begin using its connection to download video from an ftp server, and then upload that video to a video-hosting website. In doing so, the mobile station is switching quickly between receiving downlink traffic and sending uplink traffic. Downloading and uploading video may also require a significant amount of bandwidth on both the uplink and downlink. As a result, mobile station 704 or its serving base station D determines that the mobile station may benefit from bidirectional handoffs, and accordingly, should provide its preferred uplink neighbors and preferred downlink neighbors. In the event that the serving base station D makes this decision, the base station may send a preferred neighbor request message to the mobile station, which indicates the mobile station 704 should provide its preferred neighbors.

As part of the scanning process, the mobile station may select one or more sectors from the neighbor list as candidates for an uplink handoff of its uplink connection, and may select one or more sectors from the neighbor list as candidates for a downlink handoff of its downlink connection. To do so, the mobile station 704 may again determine the uplink-resource demand and the downlink-resource demand for its communication session. The mobile station 704 then determines which sectors in the neighbor list (i.e., the sectors identified by the MOB_NBR-ADV message) can provide uplink resources sufficient to meet its uplink-resource demand, and likewise, which sectors in the neighbor list can provide downlink resources sufficient to meet its downlink-resource demand. In the example illustrated, mobile station 704 concludes that sectors 14 and 20 each have an acceptable level of uplink resources available, while sectors 11, 16, and 19 each have an acceptable level of downlink resources available. The mobile station 704 then sends its serving base station D a message identifying 14 and 20 as candidates for an uplink handoff, and sectors 11, 16, and 19 as candidates for a downlink handoff.

Mobile station may then move from sector 12 to sector 19, and as it does so, may request a bidirectional handoff. In response, the base station selects an uplink-target sector and a downlink-target sector from the uplink-handoff candidates and the downlink-handoff candidates, respectively. For example, base station D may select sector 14, which is served by base station E, as the uplink-target sector, and sector 19, which is served by base station G, as the downlink-target sector. The mobile station 704 may then connect on the uplink in sector 14 via base station E, and connect on the downlink in sector 19 via base station G.

Figure 8:
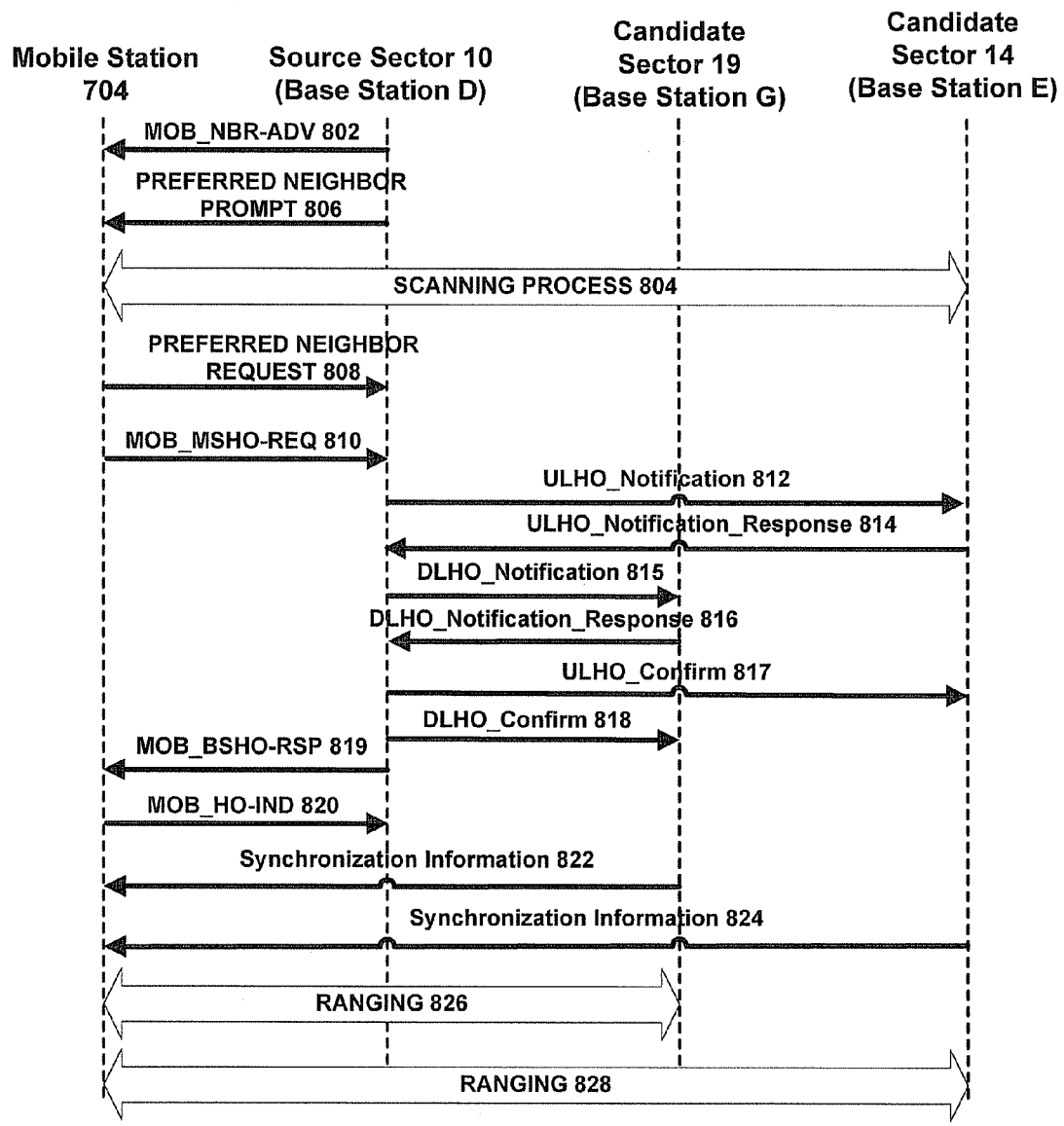
FIG. 8 is signal flow diagram illustrating the signaling involved in a bidirectional handoff, according to an exemplary embodiment.

FIG. 8 is signal flow diagram illustrating the signaling involved in a bidirectional handoff, and in particular the bidirectional handoff from sector 12 to sector 19 for uplink traffic, and to sector 14 for downlink traffic. More specifically, while located in sector 12, the mobile station periodically receives MOB_NBR-ADV message 802 and updates a list of general candidates for a handoff (i.e., a standard handoff) accordingly. Either the mobile station 704 or serving base station D may then determine that the mobile station should provide its preferred uplink and downlink neighbors to serving base station D. In the event serving base station D makes the decision, the base station may send a Preferred Neighbor Prompt message 806 to the mobile station 704.

When the mobile station receives the Preferred Neighbor Prompt message 806, the mobile station may alter its scanning process 804 to include selection of candidates for an uplink handoff and candidates for a downlink handoff. By doing so, the mobile station 704 may respond to Preferred Neighbor Prompt message 806 with a Preferred Neighbor Request message 808, which identifies the mobile station's preferred uplink sectors (e.g., sectors 14 and 20), and its preferred downlink neighbors (e.g., sectors 11, 16, and 19). The Preferred Neighbor Request message 808 may be sent from time to time, and further may be integrated as part of the scanning process once a Preferred Neighbor Prompt has been received. The mobile station 704 may send the Preferred Neighbor Request message 808 before making a decision to hand off (possibly as part of the scanning process), after deciding to hand off, and/or after initiating a handoff.

When the mobile station decides or is instructed by serving base station D to initiate a handoff, the mobile station sends a MOB_MSHO-REQ message 810 to base station D. The mobile station 704 and base station D may engage in the handover decision/initiation process as they otherwise would, except that serving base station D now selects an uplink-target sector and a downlink-target sector from the uplink and downlink candidates, respectively, that were identified in the most recent Preferred Neighbor Request message 808. The base station then sends send an uplink handoff notification (ULHO_Notification) 812 to, and receives an uplink handoff notification response (ULHO_Notification_Response) 814 from, base station E, which uplink-candidate sector 14. Similar messaging (not shown) also occurs for the other uplink-candidate sectors (e.g., between base station D and base station G serving uplink-candidate sector 20). Base station D also sends a downlink handoff notification (DLHO_Notification) 815 to, and receives a downlink handoff notification response (DLHO_Notification_Response) 816 from, downlink-candidate sector 19. Similar messaging (not shown) also occurs for the other downlink-candidate sectors (e.g., internally in base station D for sectors 11 and 12, and between base station D and base station E for downlink-candidate sector 14).

Based at least in part on the ULHO_Notification_Response(s), the serving base station D selects sector 14 (served by base station E) as the uplink-target sector. Likewise, based at least in part on the DLHO_Notification_Response(s), the serving base station D selects sector 19 (served by base station G) as the downlink-target sector. Serving base station D then sends an uplink handoff confirm (ULHO_Confirm) message 817 to uplink-target sector 14, and a downlink handoff confirm (DLHO_Confirm) 818 to downlink-target sector 19, so that these sectors can prepare to provide uplink and downlink resources, respectively, for mobile station 704. The serving base station D sends a MOB_BSHO-RSP message 819 to the mobile station 704, which identifies sector 14 as the uplink-target sector, and sector 19 as the downlink-target sector.

The mobile station 704 responds to MOB_BSHO-RSP message 819 by sending MOB_HO-IND message 820 to base station 704, which confirms that an uplink handoff to sector 14, and a downlink handoff to sector 19, should be performed. When the serving base station D receives MOB_HO-IND message 820, the serving base station D stops making downlink allocations to the mobile station, stops polling the mobile station, and, in the case of UGS and ErTPS connections, stops making uplink allocations for the mobile station. The base station may, however, continue to support bandwidth requests and uplink allocations resulting from such bandwidth requests, thus allowing the mobile station to resend the MOB_HO-IND, if necessary.

The mobile station is now ready to synchronize and perform ranging with both the uplink target sector and the downlink-target sector. To synchronize, the mobile station decodes the preamble that is broadcast by uplink-target sector 14, and the preamble that is broadcast by downlink-target sector 19, as shown by signals 822 and 824, respectively. The mobile station then receives a compressed UL-MAP message from uplink-target sector 14, and a compressed UL-MAP message from downlink-target sector 19. Each UL-MAP message allocates resources for the mobile station to send a ranging request to initiate ranging in sectors 14 and 19, respectively. The mobile station then engages in ranging 826 with base station E in order to establish an uplink connection with sector 14, and engages in ranging 828 with base station G in order to establish a downlink connection with sector 19.

Exemplary embodiments of the present invention have been described above. It should be understood the word "exemplary" is used herein to mean "serving as an example, instance, or illustration." Any embodiment described herein as "exemplary" is not necessarily to be construed as preferred or advantageous over other embodiments. In addition, those skilled in the art will understand that changes and modifications may be made to these exemplary embodiments without departing from the true scope and spirit of the invention, which is defined by the claims.

We claim:

1. A method for selecting coverage areas as candidates for a bidirectional handoff, the method comprising:
   a mobile station engaging in a communication session via an access network, wherein an uplink connection is provided for uplink traffic in the communication session and a downlink connection is provided for downlink traffic in the communication session;
   the mobile station receiving a list of coverage areas that are general candidates for a bi-directional handoff, wherein the list of general handoff candidates is received from the access network;
   the mobile station determining an uplink-resource demand and a downlink-resource demand of the mobile station, for the communication session;
   the mobile station using the uplink-resource demand as a basis for selecting one or more coverage areas from the list of general handoff candidates as candidates for an uplink handoff of the uplink connection; and
   the mobile station using the downlink-resource demand as a basis for selecting one or more coverage areas from the list of general handoff candidates as candidates for a downlink handoff of the downlink connection; and
   the mobile station sending a message to the access network that identifies the one or more candidates for the uplink handoff and the one or more candidates for the downlink handoff.

2. The method of claim 1, wherein the communication session is of a given type, wherein determining the uplink-resource demand of the mobile station for the communication session comprises determining a general level of uplink-resource demand for the type of the communication session; and wherein determining the downlink-resource demand of the mobile station for the communication session comprises determining a general level of downlink-resource demand for the type of the communication session.

3. The method of claim 1, wherein determining the uplink-resource demand and the downlink-resource demand of the mobile station for the communication session comprises:
   measuring usage of uplink resources and usage of downlink resources by the mobile station over a given period of time during the communication session;
   based, at least in part, on the usage of uplink resources, determining the uplink-resource demand of the mobile station for the communication session; and
   based, at least in part, on the usage of downlink resources, determining the downlink-resource demand of the mobile station for the communication session.

4. The method of claim 1, wherein the uplink connection is initially provided in a source coverage area of the access network, the method further comprising:
   the mobile station receiving a message that indicates an uplink-target coverage area from the candidates for the uplink handoff; and
   the mobile station performing the uplink handoff from the source coverage area to the uplink-target coverage area.

5. The method of claim 1, further comprising the mobile station receiving a response message from the access network that identifies a first target coverage area for the uplink handoff and a second target coverage area for the downlink handoff, wherein the response message is sent as a response to the message that identifies the one or more candidates for the uplink handoff and the one or more candidates for the downlink handoff.

6. The method of claim 1, wherein the downlink connection is initially provided via a source coverage area, the method further comprising:
   the mobile station receiving a message that indicates a downlink-target coverage area from the candidates for the downlink handoff; and
   the mobile station performing the downlink handoff from the source coverage area to the downlink-target coverage area.

7. The method of claim 1:
   wherein selecting the one or more candidates for the uplink handoff from the received list of general handoff candidates comprises, for each coverage area in the received list of general handoff candidates:
      determining available uplink resources in the coverage area; and
      making a determination as to whether or not the available uplink resources in the coverage area are sufficient to meet the uplink-resource demand and if the determination is that the available uplink resources in the coverage area are sufficient, selecting the coverage area as a candidate for the uplink handoff; and
   wherein selecting the one or more candidates for the downlink handoff from the received list of general handoff candidates comprises, for each coverage area in the received list of general handoff candidates:
      determining available downlink resources in the coverage area; and
      making a determination as to whether or not the available downlink resources in the coverage area are sufficient to meet the downlink-resource demand and if the determination is that the available downlink resources in the coverage area are sufficient, selecting the coverage area as a candidate for the downlink handoff.

8. The method of claim 7:
   wherein selecting the one or more candidates for the uplink handoff from the received list of general handoff candidates further comprises, for each coverage area in the received list of general handoff candidates, comparing the available uplink resources in the coverage area to available uplink resources in other coverage areas in the received list of general handoff candidates; and
   wherein selecting the one or more candidates for the downlink handoff from the received list of general handoff candidates further comprises, for each coverage area in the received list of general handoff candidates, comparing the available downlink resources in the coverage area to available downlink resources in other coverage areas in the received list of general handoff candidates.

9. The method of claim 1, further comprising:
   based on movement of the mobile station over a predetermined period of time, determining a mobility factor that quantifies the movement of the mobile station;
   using the mobility factor as a further basis for selecting the one or more coverage areas in the access network as candidates for an uplink handoff of the uplink connection; and
   using the mobility factor as a further basis for selecting the one or more coverage areas in the access network as candidates for an downlink handoff of the downlink connection.

10. The method of claim 1, wherein performance of the method is conditioned upon authorization for premium service.

11. A method for selecting one or more target coverage areas for a bidirectional handoff, the method comprising:
   (a) an access network providing a connection for a mobile station to engage in a communication, wherein the connection comprises an uplink connection for uplink traffic in the communication session and a downlink connection for downlink traffic in the communication session;
   (b) the access network receiving a message from the mobile station that identifies one or more candidates for the uplink handoff and one or more candidates for the downlink handoff;
   (c) the access network determining uplink-resource demand and downlink-resource demand of the mobile station, for the communication session;
   (d) based, at least in part, on the uplink-resource demand, the access network selecting a first target coverage area to which an uplink handoff of the uplink connection should be directed, wherein the first target coverage area is selected from the one or more candidates for the uplink handoff; and
   (e) based, at least in part, on the downlink-resource demand, the base station selecting a second target coverage area to which a downlink handoff of the downlink connection should be directed, wherein the second target coverage area is selected from the one or more candidates for the downlink handoff.

12. The method of claim 11, further comprising:
   the access network initially broadcasting a message that identifies a plurality of coverage areas as general candidates for a bi-directional handoff;
   wherein the one or more candidates for the uplink handoff and the one or more candidates for the downlink handoff are selected from the general candidates.

13. The method of claim 11, further comprising the access network sending a message to the mobile station that identifies the first target coverage area for the uplink handoff and the second target coverage area for the downlink handoff.

14. The method of claim 11, further comprising the access network conditioning performance of the method on an initial determination that the mobile station or a user of the mobile station is authorized for premium service.

15. A method for selecting candidates for a handoff of a connection between a mobile station and an access network, wherein the connection comprises an uplink connection for uplink communications and a downlink connection for downlink communications, the method comprising:

the access network initially broadcasting a message that identifies a plurality of coverage areas as general candidates for a bi-directional handoff;

the access network determining an uplink-resource demand and a downlink-resource demand by the mobile station for communications via the connection;

based, at least in part, on the uplink-resource demand and the downlink-resource demand, the access network making a determination as to whether to operate in a first mode or a second mode, wherein operation in the first mode comprises using a standard handoff process, and wherein operation in the second mode comprises using a bidirectional handoff process, where the bidirectional handoff process comprises an uplink handoff of the uplink connection and a downlink handoff of the downlink connection;

if the determination is to operate in the second mode, then:
  (i) identifying one or more coverage areas from the general candidates as candidates for the uplink handoff; and
  (ii) identifying one or more coverage areas from the general candidates as candidates for the downlink handoff; and if the determination is to operate in the first mode, then the access network selecting one or more coverage areas as candidates for a standard handoff performed according to the standard handoff process, wherein the standard handoff process comprises a handoff of both the uplink and downlink connections to a single coverage area.

16. The method of claim 15, wherein identifying one or more coverage areas as candidates for the uplink handoff of the uplink connection and one or more coverage areas as candidates for the downlink handoff of the downlink connection comprises:

sending a preferred-coverage-area prompt message to the mobile station; and receiving a preferred-coverage-area message from the mobile station, wherein the preferred-coverage-area message is received as a response to the preferred-coverage-area prompt message, and wherein the preferred-coverage-area message identifies the one or more candidates for the uplink handoff and the one or more candidates for the downlink handoff.

17. The method of claim 16, further comprising, if the determination is to operate in the first mode, then selecting an uplink-target coverage area for the uplink handoff and a downlink-target coverage area for the downlink handoff, wherein the first target coverage area is selected from the candidates for the uplink handoff, and wherein the second target coverage area is selected from the candidates for the downlink handoff.

* * * * *